United States Patent
Gefflaut et al.

(10) Patent No.: US 7,688,788 B2
(45) Date of Patent: Mar. 30, 2010

(54) CONGESTION LEVEL AND SIGNAL QUALITY BASED ESTIMATOR FOR BIT-RATE AND AUTOMATED LOAD BALANCING FOR WLANS

(75) Inventors: Alain F. Gefflaut, Herzogenrath (DE); Petri Mähönen, Aachen (DE)

(73) Assignee: Microsoft Corporation, Redmond, WA (US)

(*) Notice: Subject to any disclaimer, the term of this patent is extended or adjusted under 35 U.S.C. 154(b) by 836 days.

(21) Appl. No.: 11/247,442

(22) Filed: Oct. 11, 2005

(65) Prior Publication Data

US 2007/0081462 A1 Apr. 12, 2007

(51) Int. Cl.
*H04W 4/00* (2006.01)
(52) U.S. Cl. ........................... 370/332; 370/235
(58) Field of Classification Search ............. 370/329, 370/230, 235, 395, 229, 233, 344, 332; 235/381; 705/5; 714/776; 455/522; 375/267
See application file for complete search history.

(56) References Cited

U.S. PATENT DOCUMENTS

| 6,129,274 | A  | * | 10/2000 | Suzuki .................. 235/381 |
| 6,539,205 | B1 |   | 3/2003  | Wan et al. .............. 455/67.1 |
| 6,747,953 | B1 | * | 6/2004  | Qureshi et al. ........... 370/235 |
| 2002/0097718 | A1 |   | 7/2002 | Korus et al. ............ 370/390 |
| 2003/0125066 | A1 | * | 7/2003 | Habetha ................. 455/522 |
| 2005/0003827 | A1 |   | 1/2005 | Whelan ................. 455/454 |
| 2005/0005227 | A1 | * | 1/2005 | Felbecker et al. ......... 714/776 |
| 2005/0015285 | A1 | * | 1/2005 | Tamaki ................... 705/5 |
| 2006/0034244 | A1 | * | 2/2006 | Huang et al. ............ 370/344 |
| 2006/0072502 | A1 | * | 4/2006 | Crandall et al. .......... 370/329 |
| 2006/0146705 | A1 | * | 7/2006 | Waxman ................ 370/230 |
| 2006/0187873 | A1 |   | 8/2006 | Friday et al. ............ 370/328 |
| 2006/0198460 | A1 | * | 9/2006 | Airy et al. .............. 375/267 |
| 2007/0091851 | A1 | * | 4/2007 | Simonsson et al. ........ 370/332 |

* cited by examiner

*Primary Examiner*—Kwang B Yao
*Assistant Examiner*—Syed Bokhari
(74) *Attorney, Agent, or Firm*—Woodcock Washburn LLP (57) ABSTRACT

A method and system for determining the bit-rate between a wireless station and one or more access points that takes into account the usage (congestion) of the access points. Each wireless station includes software and/or hardware for estimating the bit-rate between the wireless station and any available access points and provides automatic load balancing for the wireless network. Dual estimator and backpressure algorithms are utilized to better estimate the achievable bit-rate available to a wireless station associated with an access point and to provide congestion sensitive access point selection. Bandwidth estimation is provided while taking into account congestion information for building up associations to access points while automatically achieving load balancing of the traffic among available access points.

16 Claims, 4 Drawing Sheets

Figure 1

| 1 Byte | 1 Byte | Length Bytes |
|---|---|---|
| Element ID | Length | Data |

| 1 Byte | 1 Byte | Length Bytes |
|---|---|---|
| Element ID = 33 | Length = 8 | 8 bytes for Congestion info |

CONGESTION LEVEL AND SIGNAL QUALITY BASED ESTIMATOR FOR BIT-RATE AND AUTOMATED LOAD BALANCING FOR WLANS

FIELD OF THE INVENTION

The present invention relates to wireless access technologies and, more particularly, to a system and method of achieving congestion load balancing when multiple access points are available so as to ensure the best download bit-rate to wireless stations.

BACKGROUND OF THE INVENTION

At present, freely deployed wireless access technologies, most notably the IEEE 802.11 family (a.k.a. WiFi), do not support any reliable means to determine the real achievable bit-rate over the link between a wireless terminal (STA) and an access point (AP), or between two terminal stations. This is due to fact that conventional AP beacons broadcast only their bit-rate technical capability, not real estimations of what could be achieved in the particular environment taking into account signal quality and current congestion levels. As a result, the information used by a STA to connect to an AP is inaccurate and incomplete.

This limitation in the art poses problems for WiFi users, for many end-user applications require information on the real achievable bit-rate before making a decision of which access point to associate when multiple access points are available. Conventional WiFi technology provides information regarding signal quality to assist in the determination of the estimated bit-rates; however, the conventional bandwidth (bit-rate) estimators, such as Pathcar, require build up of the full connection (i.e., a full association in the WiFi network between AP and STA and an IP connection over the created link) in order to probe by using network packets. As a result, such methods require a substantial amount of latency and overhead and, most importantly, such techniques are not applicable to a determining which AP to build up a connection to in the first place. The future 802.11k extension promises to provide some two-way signal strength information also from the AP to the STA, including history information, but not real bit-rate estimation.

In view of the needs in the art for improved bit-rate estimation prior to making WiFi connections between STAs and APs, a simple method is desired to better estimate the download bit-rate between a STA and an AP that takes into account the congestion on the corresponding AP as well as the signal quality. A system and method for achieving congestion load balancing when multiple APs are available, thus ensuring the best download bit-rate to wireless stations, is also desired. The present invention addresses these needs in the art.

SUMMARY OF THE INVENTION

In view of the above-mentioned needs in the art, the present invention relates to an access point selection technique and a wireless station including an algorithm that provides a better estimation of the achievable bit-rate available to a wireless station from a local access point at any given time by determining the congestion on each access point as well as signal quality and using this data to modify the achievable bit-rates at each access point to a more realistic value for more informed access point selection. In other words, the method and apparatus of the invention allows the wireless station to be adapted to provide bandwidth estimation taking into account congestion information for congestion sensitive access point selection. The method and apparatus of the invention also automatically achieves load balancing of the traffic among available access points since congestion sensitive information is taken into account prior to access point selection.

In particular, the invention includes a method and a device for implementing a method of determining the estimated achievable bit rate between a wireless terminal and one or more access points. The method includes the steps of receiving congestion information and signal quality information from each access point to be checked for estimated achievable bit rate and calculating the estimated achievable bit rate as a function of the congestion information and the signal quality information. When more than one access point is checked for estimated achievable bit rate, the method includes selecting an access point to connect to that has the highest estimated achievable bit rate among those access points so checked.

In a first embodiment of the invention, the congestion information is obtained in response to probes of each access point by the wireless terminal (called active scanning in the 802.11 terminology), while in a second embodiment of the invention the wireless terminal receives beacon packets containing congestion information from each access point to be checked for estimated achievable bit rate (called passive scanning in the 802.11 terminology). The signal quality information is used to estimate the bit error rate of data from each access point based on the signal to noise ratio (or a received signal strength indicator) of a signal received from each access point. In an exemplary embodiment, the packet error rate (PER) is calculated from the bit error rate (BER) in each modulation mode of each access point in accordance with the following relation: $PER=1-(1-BER)^L$, where L is the length of a transmitted data packet.

The invention also includes a method of providing congestion load balancing when multiple access points are available to a wireless terminal for network access. This method of the invention includes calculating the estimated achievable bit rate from a given wireless terminal to each access point as a function of congestion information and signal quality information received from each access point and the wireless terminal selecting an access point from the access points to connect to that has the highest estimated achievable bit rate among the access points. Such an approach provides automatic congestion load balancing based on the access point selections.

The methods of the invention may be implemented in the form of a software algorithm that is loaded into a processor to implement the congestion load balancing function of the invention. On the other hand, the methods of the invention may be implemented using a wireless network card having a firmware algorithm loaded therein that implements congestion load balancing function of the invention.

In exemplary embodiments, the congestion information is used by a processor to select a prestored bandwidth correction factor from a lookup table. Similarly, the signal quality information from each access point may be used by the processor to select an estimated packet error rate and/or an estimates bit error rate of each access point for each modulation mode from a table. A precomputed bandwidth correction factor may also be stored in a table and selected by the processor based on the received congestion information.

The scope of the invention also includes computer readable media including software for calculating the estimated achievable bit rate of a wireless access point as a function of congestion information and signal quality information received from the wireless access point. Such a computer readable media in accordance with the invention includes a first block of code that implements a bit rate estimation algorithm for determining a maximum estimated bit rate as a function of the signal quality and a second block of code that implements a correction algorithm that modifies the maximum estimated bit rate calculated by the first block of code to the estimated achievable bit rate using a bandwidth correction factor that corrects for congestion on the wireless access point.

Those skilled in the art will appreciate that the bit-rate estimation technique of the invention can be included in connection managers and network connectivity parts of an operating system or similar entities to provide intelligent protocol stacks and an enhanced user experience. The invention also can be included in the GOLLUM-project (European project http://www.ist-gollum.org) for building Universal Link Layer API based connection managers and as a modification of 802.11k standardization for use in wireless devices. Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity with respect to FIGS. 1-5 to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

The invention relates to a method and system for determining the bit-rate between a wireless station and one or more access points. At present, WiFi does not support any reliable means to determine the real achievable bit-rate over the link between a wireless station (STA) and an access point (AP), or between two wireless stations. The invention takes advantage of the openness of the 802.11 standards (e.g., the 802.11k extension that promises to provide some two-way signal strength information from the AP to the STA, including history information) to perform a more realistic bit-rate estimation. In particular, the invention provides a simple method to estimate bit-rate between the STA and any available APs and provides automatic load balancing for the wireless network. The invention utilizes dual estimator and backpressure algorithms to better estimate the achievable bit-rate available to a wireless station associated with an access point (AP), and to provide congestion sensitive access point selection. A key feature of the invention is the ability to provide bandwidth estimation while taking into account congestion information for building up associations to APs while automatically achieving load balancing of the traffic among available APs.

System Description

Figure 1:
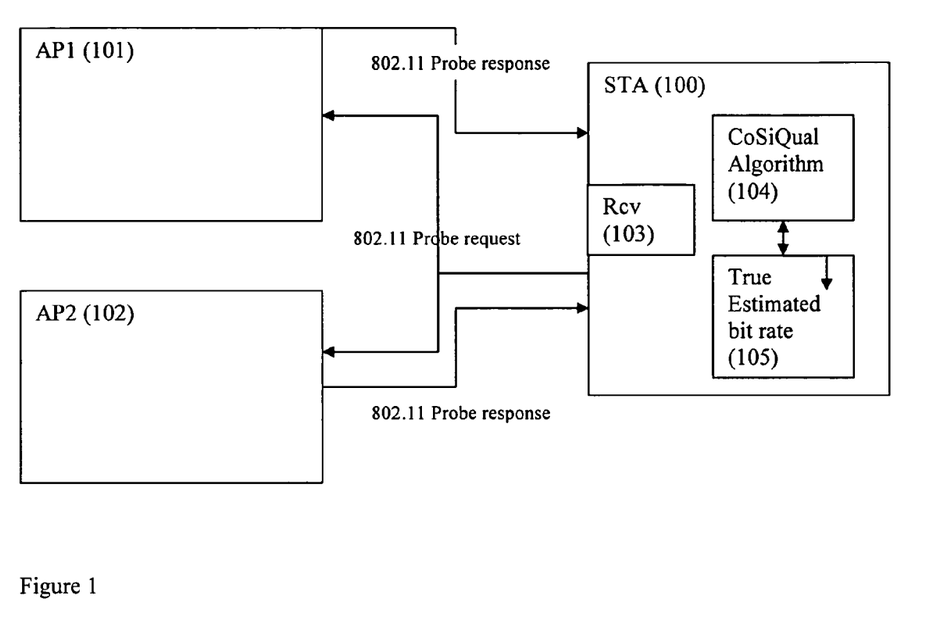
FIG. 1 illustrates a simple example of a wireless station (STA) that performs bandwidth estimation for two available WiFi access points (APs) in accordance with the invention.

FIG. 1 illustrates a simple example of a wireless station (STA) 100 that performs bandwidth estimation for two available WiFi access points (APs) 101 and 102 in accordance with the invention. Of course, the STA 100 may be in communication range of multiple APs; the same techniques described herein would be used for the other APs as well.

Figure 2:
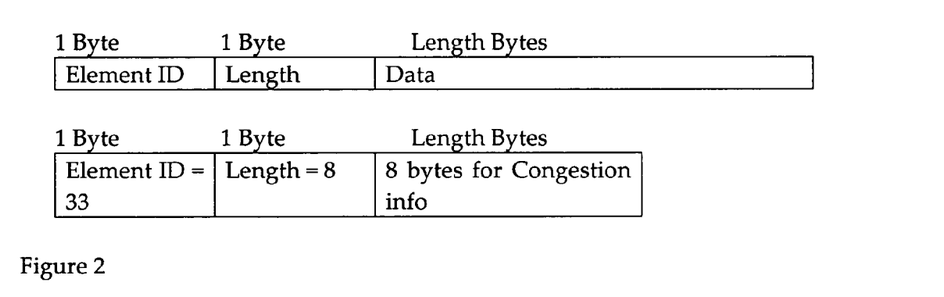
FIG. 2 illustrates an IEEE 802.11 information element and congestion information element.

In the WiFi configuration of FIG. 1, each AP (101 and 102) is required to send to the STA 100 some extra information on a regular basis that the STA 100 may use to determine the level of congestion on each AP 101 or 102 at a given point in time. In a simple embodiment of the invention, this congestion information is represented as a tuple component vector, where the different elements of the tuple are used as an indication of the congestion on the AP. Information such as the average congestion window information, the number of nodes or the number of retransmissions could be used as such congestion information. In a first embodiment of the invention, the congestion information is added to the existing information that is transferred in management packets called beacon packets and sent by the APs on a regular basis (in general, every 100 ms) or in response to probe requests (probe responses in the 802.11 terminology). These management frames normally contain information such as the SSID (Service Set Identifier), the supported data rates, the modulation methods for the physical layer (Frequency hopping, Direct Sequence Spread Spectrum, and the like) and the capabilities of the AP. The IEEE 802.11 standard defines the notion of Information Elements that are variable-length components that can be included in such management frames. FIG. 2 illustrates such an IEEE 802.11 information element and congestion information element. As illustrated, each such 802.11 information Element contains 1 byte describing the element ID, 1 byte describing the length in bytes of the data associated to the Information Element, and finally the information itself. At present, element IDs from 32 to 255 are still unused in the IEEE 802.11 standard, so it is feasible to use, for example, element ID 33 to define a new congestion Information Element as illustrated. If it is assumed that two values are needed to describe the congestion on an AP and that they can be represented as two integers using 4 bytes each, then the length field should be set to 8 and the total length of the Congestion Information Element would reach 10 bytes. In order to make sure that wireless stations get the congestion information, the Congestion Information Element should be added to every beacon and probe response management frames of the 802.11 standard (in order to be supported in both passive and active scanning) in order to provide the congestion information used by the invention. Of course, other available element IDs could be used if element ID 33 is unavailable.

In another embodiment of the invention, rather than modifying the element ID to provide the congestion information, a new protocol extension such as IEEE 802.11k is used to enable wireless stations to directly query the congestion level of the access point with a probe request as illustrated in FIG. 1.

Upon receipt by receiver 103 (FIG. 1) of each wireless station, such AP congestion information is used by each wireless station (STA) as an input to the congestion signal quality (CoSiQual) algorithm 104 of the invention that is loaded to run on the processor of each STA 100. The CoSiQual algorithm 104 is run in order to combine the congestion information provided by the AP with the signal quality received with beacon frames arriving from the AP. As explained in more detail below, the CoSiQual algorithm works in such a way that it receives beacons from all the access points around it. In particular, the CoSiQual algorithm receives as inputs the received_signal_strength (P_rx) of each access point, the received_congestion_information, and possible extra information on the signal strengths (P_others) of other wireless stations as seen by each access point. The CoSiQual algorithm returns a value indicating an estimated bandwidth achievable when connecting to the considered APs, taking into account the level of congestion on this AP as well as the signal quality. Thus, this value may be used to determine the true estimated bit-rate 105 that is a better estimate of the actual available bit-rate from each AP so that the most efficient AP connection may be selected in accordance with environmental and congestion conditions.

CoSiQual Algorithm

Figure 3:
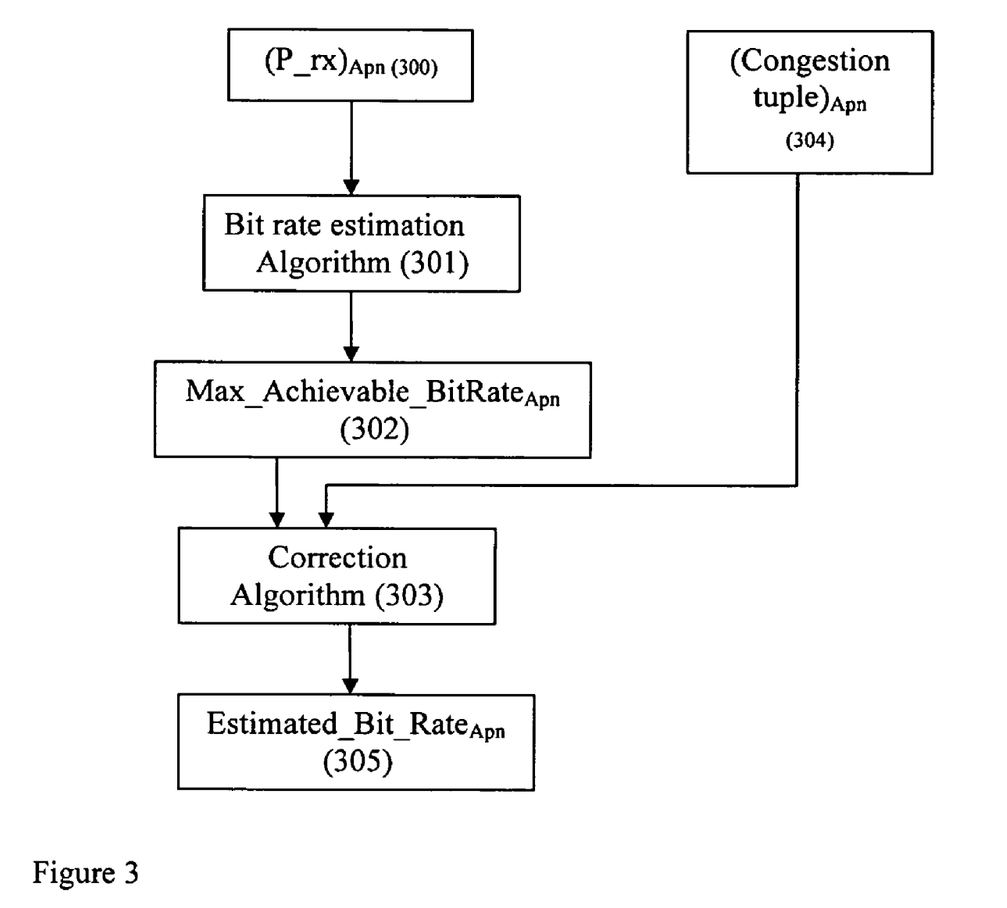
FIG. 3 illustrates the congestion signal quality algorithm (CoSiQual) implemented in the wireless station of the invention.

FIG. 3 illustrates the congestion signal quality algorithm (CoSiQual) 104 implemented on the processor of each STA 100 in accordance with the invention. As illustrated, the CoSiQual algorithm 104 receives as input the received signal strength value (P_rx) received from each AP (APn) in range of the wireless station 100 to estimate the signal environment in general around STA 100 and each AP. From this information, the CoSiQual algorithm 104 estimates what is the most probable downstream bit-rate that can be achieved if the STA 100 connects to the considered AP (hereinafter called "Max_Achievable bit-rate"). In this fashion, the invention implements the inventors' recognition that congestion on the access point is a crucial issue for true bit-rate estimation and that this congestion information does not appear in the Physical Layer information typically provided. The invention provides a software component that implements the CoSiQual algorithm of FIG. 3 on the processor of each STA 100 so as to execute the estimator for achievable network level connection speed as described below.

As shown in FIG. 3, the physical level (signal strength) information (P_Rx) received by the wireless station at step 300 is taken by a bit-rate estimation algorithm 301 (described in detail below) as a starting point to derive the maximum achievable bit-rate (Max_Achievable_BitRate 302, which in the most environments would be an overestimated value since it is basically just telling what is the best achievable bit rate assuming the current physical conditions without congestion on the Access Point (no dropped packets).

At step 303, a correction algorithm (described in detail below) receives the congestion information received at step 304 and combines the congestion information with the Max_Achievable_BitRate value from step 302 to derive a true estimate of the bit rate (Estimated_Bit_Rate) 305. For each considered AP, the estimated bit-rate 305 is then used to decide to which AP to connect. In principle, the idea is that when the average congestion level is very high, the association to the access point (even with the high bit-rate mode) does not make sense, since collisions and competition between stations force one to get only a very minimal true bit-rate for applications.

To make the estimator of FIG. 3 very fast, a simple implementation could use a look-up table, or decision tree, where congestion tuples of the form (C1, . . . , Cn) are mapped to a bandwidth correction factor. The bandwidth correction factor table could be stored in a memory of STA 100 (FIG. 1) and built by using real measurements and/or off-line simulations that are statically tabulated into software for incorporation into a connection manager, device driver, or similar software entity. Because of its simplicity, this algorithm could easily be embedded in the firmware used on 802.11 cards or as software running on the main processor of the wireless stations.

On the other hand, the CoSiQual algorithm of FIG. 3 can also be used to replace the currently existing algorithm used by wireless card to decide to which AP they should connect. As noted above, conventional algorithms of this type compare the signal quality of the discovered APs (the one that sent a beacon due to a passive or active scanning) and connect to the one providing the best signal quality. Such conventional algorithms assume that the best signal quality will automatically translate into the best bandwidth for the client station. The CoSiQual algorithm described herein can be used to replace this default algorithm so that client stations will choose the AP that will provide the best true bandwidth, thus automatically achieving load balance of the client stations on the available APs. In a simple embodiment of the invention, the CoSiQual algorithm could be implemented in the firmware of wireless cards or as periodic software (time based) running on the main processor of a wireless station of the type illustrated in FIG. 1.

The invention thus provides at least two significant benefits. First, the invention provides a method for applications to decide between access points based on real estimation of achievable bit-rate, instead of pure theoretical physical layer advertisement. Second, by biasing the AP decision strongly with the congestion information, distributed and automated load balancing is automatically provided to the network. This capability is not present in conventional WiFi systems making them vulnerable to unlimited overload. The load balancing occurs automatically and in a distributed fashion since the wireless stations themselves are avoiding overloaded access points due to the fact that those access points provide less bit-rate over other possible alternatives.

Bandwidth Estimation Algorithm (301)

In an exemplary implementation, the Bit Rate Estimation Algorithm 301 is used to estimate the theoretical maximum bit-rate that could be reached if the STA 100 connects to the considered AP. The underlying theoretical basis of this estimation is the well-known communications signal theory based laws (see, e.g., Proakis, Digital Communications, McGraw-Hill) that directly relate the Signal-to-Noise (SNR) ratio on a receiver to the Bit-Error-Rate (BER) if the modulation and channel coding is known. As there is no channel coding in conventional WiFi products, knowing the modulation is enough.

If the true (or average) packet size of the transmission frames is known, the Packet Error Rate (PER) can be estimated using the relation:

$$PER = 1 - (1 - BER)^L$$

where L is the length of the packet and BER is the probability of the bit-error. It will be appreciated that this estimation is only a rough one, since it assumes that bit-errors are uncorrelated (which is not true in the typical wireless channel).

This relation forms the fundamental basis to estimate how often packets are lost due to channel conditions (as measured through SNR). In an exemplary implementation, standard equations are not used to determine BER and PER. Instead, a table is used which is either a standard one (e.g., from an operating system) or specifically provided by a device manufacturer (e.g., through a device driver). This table could look like the following Table 1 where a range of SNR is mapped to bit error rates and packet error rates:

TABLE 1

| SNR | BER | PER |
|---|---|---|
| 20 dBm-25 dBm | 0.05 | 0.12 |

Such a table is desirable in an exemplary configuration of the invention since such a table provides a much faster look-up type of implementation than executing functions that calculate with floating point numbers. Also, the use of tables enables device manufacturers to provide tables that are tailored to their particular hardware. This feature is quite important since device dependency can be very important for making more reliable estimation; hence conversion tables provided by device manufactures would be preferred over the generic conversion.

The dependency of the table entries on devices is due to the fact that signal theory provides only a theoretical estimate for an ideal transceiver. Obviously, no ideal transceiver exists. Instead, different implementations of radio equipment provide different quality, which in practice means that for any realistic transceiver the bit-error rate (and packet error rate) is higher than what would be calculated by using purely theoretical equations. As the correction factor is not linear for real transceiver implementations, a device manufacturer provided table could lead to a much more reliable estimator than anything else presently available.

It will be appreciated by those skilled in the art that since there are several different modulation modes available in IEEE 802.11, there are as many different conversion tables and also cross correlation among those modes. This is required since it becomes possible to estimate PER for any modulation by measuring SNR with any other modulation mode. As an example, a WLAN access point might beacon packets in 1 Mbps (DSSS/BPSK modulation) mode. By receiving those signals, a transceiver can measure SNR in 1 Mbps mode and can calculate an estimate of PER in that mode. However, in accordance with the invention, a separate Table 2 as shown below may be available where the value of Measured_1Mbps_SNR may be stored and the value of PER for other modes determined:

TABLE 2

| SNR = 25 dBm | Measurement Mode = DSSS/BPSK | BER = 0.03 in DSSS/BPSK | BER = 0.07 in DSSS/QPSK | BER = 0.2 in ... |
|---|---|---|---|---|

Once the estimated packet error rate is determined, an achievable bit-rate based on the estimated packet error rate may be estimated. In the theoretical domain, if there is no congestion, the available bit-rate (more correctly the selected modulation mode) is dependent on the achievable PER. As noted above, in existing IEEE 802.11 implementations, the devices switch to the best possible (highest achievable bit-rate) modulation mode, where Packet Error Rate is modest enough. The logic behind this is that too high of a packet error rate would lose too many packets anyway and, accordingly, it would be more suitable to switch to a slower bit-rate (different and more robust modulation) in order to get a better throughput. Thus, the algorithm of the invention uses simple PER range values to estimate the modulation mode (bit-rate) that the wireless LAN device will switch into.

To compute a maximum achievable bit-rate, the following simple model can be used in accordance with the invention. It is assumed that an 802.11b network uses DSSS at the physical layer, that a single client is connected (no collision), that UDP is used, and that the data frame is 1472 bytes long (1500 bytes with UDP and IP header). These assumptions represent a best case scenario (no contention, no retransmission, no back off times) and should provide an estimate of the maximum achievable bit rate. Using the 802.11 standard, the time between two frames that can be sent to a wireless station can be computed as:

TFrame=TDIFS+TDataFrame+TSIFS+TACK where TDIFS=50 us and TSIFS=10 us. It is assumed that TDataFrame can be computed as:

TDataFrame=TPreamble+TPLCPHeader+TMACHeader+TData where:
TPreamble=144 µs and corresponds to the time to send the preamble (144 bits at 1Mbits/s);
TPLCPHeader=48 µs and corresponds to the time to send the PLCP header (48 bits at 1Mbits/s);
TMACHeader=288/Rate and corresponds to 30 bytes MAC header and 6 bytes SNAP header transmitted at the chosen rate; and TData=1500/Rate and corresponds to the 1500 bytes of data transmitted at the chosen rate.

Finally:

TACK=TPreamble+TPLCPHeader+TMACACK where TMACACK=14/Rate and corresponds to 14 bytes of MAC for a 802.11 ACK transmitted at the chosen rate, and where rate is the modulation rate used and can be chosen among the allowed modulation rates (1, 2, 5.5 and 11 Mbits/s in IEEE 802.11).

Having computed TFrame, it is easy to compute the achievable bandwidth knowing that 1472 bytes of data have really been transferred. The following Table 3 gives the results for the supported data rates with the previous assumptions:

TABLE 3

| Data rates supported corresponding to modulation modes | Tframe | Max UDP Achievable bit rate |
|---|---|---|
| 1 Mbit/s | 12844 µs | 0.92 Mbits/s |
| 2 Mbits/s | 6788 µs | 1.73 Mbits/s |
| 5.5 Mbits/s | 2924 µs | 4.03 Mbits/s |
| 11 Mbits/s | 1571 µs | 7.49 Mbits/s |

Table 3 can be embedded on client wireless devices in order to associate a maximum achievable bandwidth to a modulation mode. Those skilled in the art will appreciate that a similar computation could be realized for TCP or any other transport protocol.

Correction Algorithm 303

As noted with respect to FIG. 3, a correction algorithm may be used by the invention to correct the bit-rate estimate that has been calculated in order to compute a more realistic estimate of the available bit-rate taking into account the level of congestion on the AP. The bandwidth estimation bit-rate used by algorithm 301 is based on the assumption that there is only a single active radio-link between WLAN access point and the WLAN station. In practice, the available bit-rate must be shared (in a non-optimal, statistical way) with other devices served by the access point. In a simple implementation of the correction algorithm, a correction factor is computed from the congestion information and applied to the Max_Achievable_BitRate value to derive a real estimate of the bandwidth available to a station if it connects to the considered AP.

Different implementation of the correction algorithm may be used. In an exemplary embodiment, the information provided by the AP is used to compute a correction factor that will be applied to the estimated maximum achievable bandwidth as described in detail below.

If it is assumed that the congestion information provided by the AP includes the average value of the congestion windows (CW) over the set of devices already connected to the AP and the average number of retransmissions (NumRetrans) per frame (this value can also easily be computed by the AP using the individual congestion windows of each device), the following overhead per frame, due to retransmissions, can be computed.

Each time a frame has to be retransmitted the overhead incurred is:

$$TOverheadRetrans = TDIFS + TData + TEIFS$$

where TEIFS corresponds to the time to detect that the previous frame has been lost. In the 802.11 standard, this time $$TEIFS = TSIFS + TDIFS + TACK.$$

This retransmission overhead only depends on TACK, which also depends on the modulation rate used. Assuming that the same model is used as to compute the maximum achievable bandwidth, the overhead for a retransmission is presented in the following Table 4.

TABLE 4

| Data rates supported corresponding to modulation modes | TOverheadRetrans |
| --- | --- |
| 1 Mbit/s | 12414 μs |
| 2 Mbits/s | 6358 μs |
| 5.5 Mbits/s | 2724 μs |
| 11 Mbits/s | 1403 μs |

If a congestion window exists, according to the 802.11 standard, each frame that is retransmitted is delayed with an average of CW/2 time slots added to the retransmission overhead. The global overhead created can be computed if it is assumed that the average Congestion Windows (CW) and the average number of retransmissions will not change significantly with the new device connected as:

$$TOverhead = NumRetrans*(TOverheadRetrans + (CW/2)*TTimeSlot)$$

where TTimeSlot corresponds to the time slot used by the underlying 802.11b network (this is a fixed value set to 20 us). This operation is simple to implement either in software or hardware.

Finally, the correction factor may be computed using the following formula:

$$CorrectionFactor = TFrame/(TFrame + TOverhead)$$

Once the correction factor is obtained, a simple multiplication of the Max_Achievable_Bitrate computed previously will provide an estimated bandwidth taking into account the congestion in the network.

Those skilled in the art will appreciate that the operations presented herein are simple enough to be implemented either in software or in hardware and that no specialized hardware is required. Other simpler implementations of the correction algorithm could use pre-computed values embedded in a table so as to permit a quick match of the estimation factor from the average congestion window, the average number of retransmissions, and the modulation rate. Also, using a table for the implementation of the bandwidth correction factor estimator of the invention has another practical interest, namely, that manufacturers would then be able to download their own version of the table that best matches the characteristics of their AP.

EXAMPLE

The technique described in detail above will now be described with respect to an example. In the example, it is assumed that in the embodiment of FIG. 1a STA 100 can choose between two available APs (AP 101 in 11 Mbits/s modulation mode and AP 102 in 5.5 Mbits/s modulation mode). Initially, the STA 100 scans the network by sending a probe request. Each AP receiving the probe request answers with a probe response containing the congestion information embedded in its probe response as described above. From signal quality associated with the probe responses, the STA 100 derives the possible maximum achievable bandwidths for each AP 101 and 102. For AP1 (101), the Max UDP Achievable bit rate value is 7.49 Mbits/s (Table 3) and the quality of the signal is determined to be good. For AP2, the Max UDP Achievable bit rate value is only 4.03 Mbits/s (Table 3) and the signal quality is determined to be average. Based on this data, conventional algorithms would pick AP 101 since congestion data is not taken into account. However, from here a device implementing the technique of the invention uses the congestion information embedded in the probe responses to compute a correction factor to apply to the computed bandwidth. For AP 101, the correction factor, computed as previously described, has a value of 0.28 while for AP 102 the correction factor value is 0.77. If these correction factors are used to compute an estimated available bandwidth:

$$Estimated\ BW\ AP101 = 7.49*0.28 = 2.09\ Mbits/s\ and$$

$$Estimated\ BW\ AP102 = 4.03*0.77 = 3.1\ Mbits/s$$

Thus, using the estimated bandwidth, it appears that AP 102 should be connected to instead of AP 101 even though AP 101 has a greater reported bandwidth and provides a better signal. This is so because of the significant correction factor based on the congestion experienced by AP 101.

Exemplary Computer Environment

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for calculating estimated achievable bit-rate in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the estimation of the maximum achievable bit-rate of an access point using the methods of the present invention.

Figure 4:
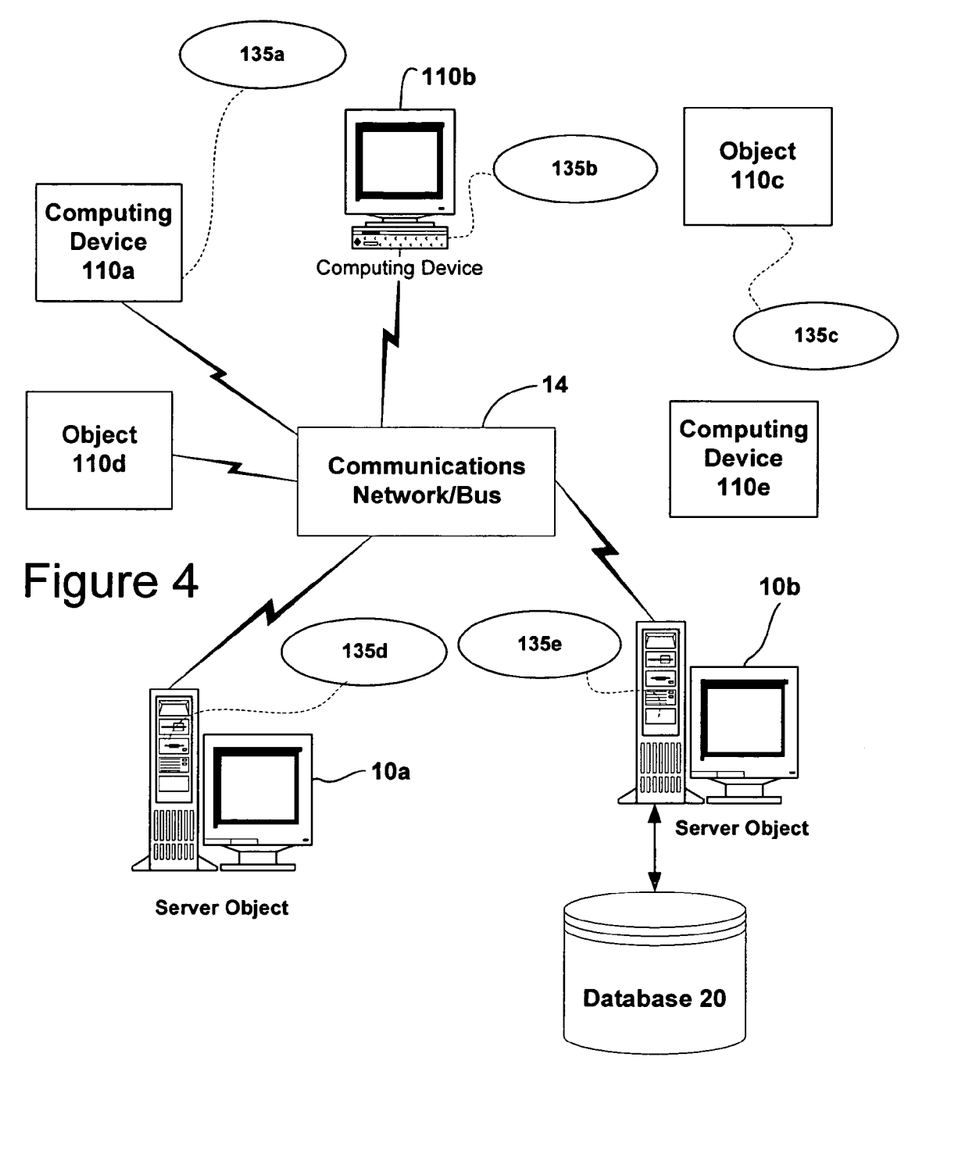
FIG. 4 is a block diagram representing an exemplary network environment having a variety of computing devices in which the present invention may be implemented.

FIG. 4 provides a schematic diagram of an exemplary networked or distributed computing environment that may be used in the implementation of the invention. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 4, and may itself represent multiple interconnected networks. In accordance with an aspect of the invention, each object 10a, 10b, etc. or 110a, 110b, 110c, etc. may contain a bit-rate estimation application implementing the methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary wireless communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 4, computers 110a, 110b, etc. can be thought of as clients and computer 10a, 10b, etc. can be thought of as servers, although any computer could be considered a client, a server, or both, depending on the circumstances. Any of these computing devices may process data in a manner that implicates the wireless access techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the informationgathering capabilities of the server. Any software objects utilized pursuant to the persistence mechanism of the invention may be distributed across multiple computing devices.

Client(s) and server(s) may communicate with one another utilizing the functionality provided by a protocol layer. For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 4 illustrates an exemplary networked or distributed environment, with a server in communication with client computers via a network/bus, in which the present invention may be employed for wireless access to a network. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to access a wireless access point.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may access a wireless access point using the techniques of the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computer

Figure 5:
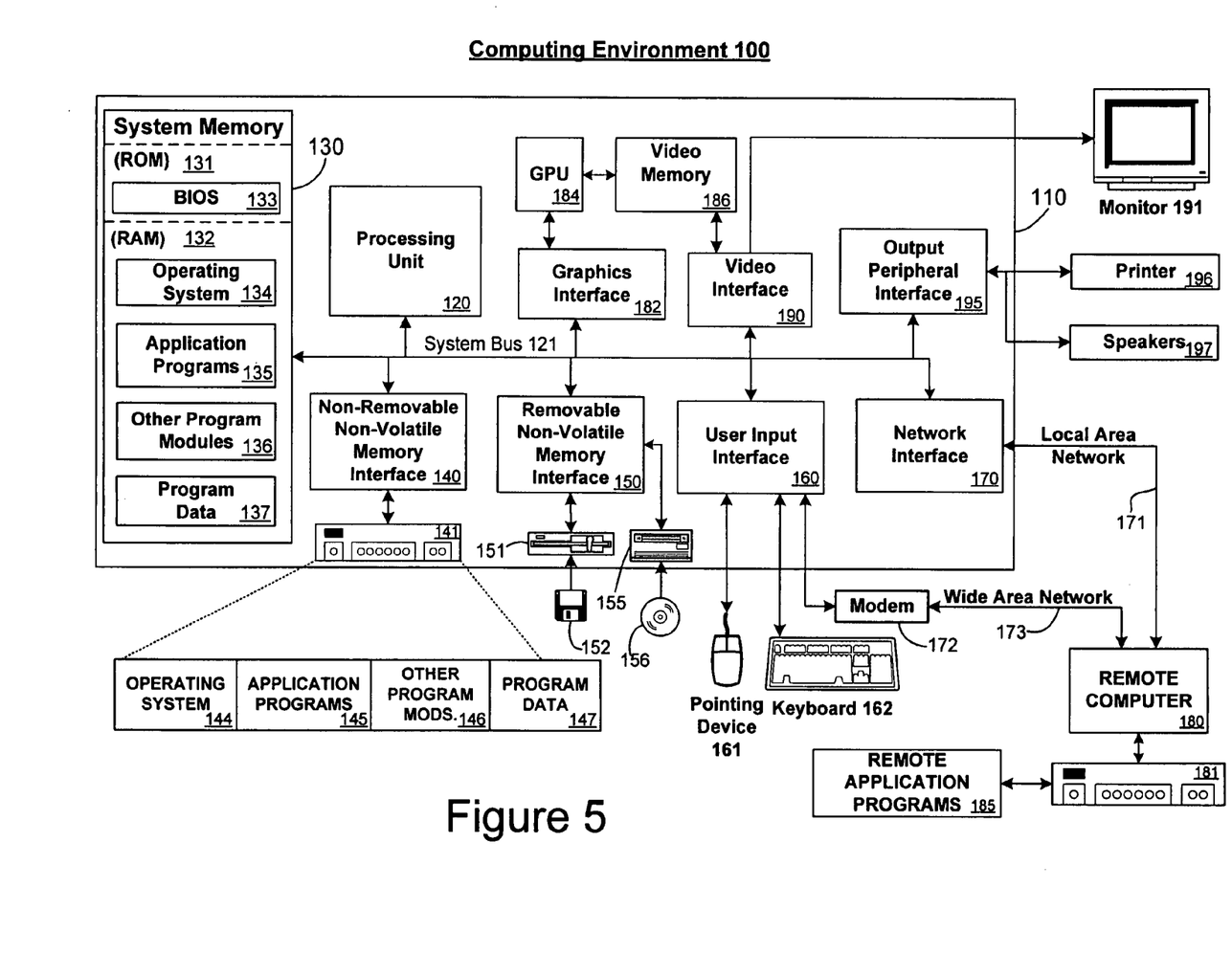
FIG. 5 is a block diagram representing an exemplary computing device in which the present invention may be implemented.

FIG. 5 and the following discussion are intended to provide a brief general description of a suitable computing device in connection with which the invention may be implemented. For example, any of the client and server computers or devices illustrated in FIG. 4 may take this form. It should be understood, however, that handheld, portable and other computing devices and computing objects of all kinds are contemplated for use in connection with the present invention, i.e., anywhere from which data may be generated, processed, received and/or transmitted wirelessly in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted wirelessly to another computer is a desirable, or suitable, environment for operation of the wireless network access technique of the invention.

Although not required, the invention can be implemented via an operating system, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 5 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 5, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5 provide storage of computer readable instructions, data structures, program modules and other data for the computer 110. In FIG. 5, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

As the foregoing illustrates, the present invention is directed to a system and method for estimating the download bit-rate between a client station and an access point by taking into account the congestion on the corresponding access point and achieving congestion load balancing when multiple access points are available. It is also understood that changes may be made to the embodiments described above without departing from the broad inventive concepts thereof. For example, while the exemplary embodiment addresses 802.11b networks, those skilled in the art will appreciate that a similar embodiment could be used for 802.11g or 802.11a by adapting the timing values. Also, while the exemplary embodiment computes an estimate of the download bit rate (AP to STA), those skilled in the art will appreciate that the same algorithm could be used to compute the upload bandwidth (STA to AP). In such a case, the STA would need to receive the information about the SNR of the received signal on the AP. Similarly to the solution used to send the congestion information, the SNR received on the AP could be added to existing management frames in the form of a new information element. Moreover, while the exemplary embodiments suggested that the congestion information would be gathered periodically, those skilled in the art will appreciate that the calculations described herein could be performed continually using continually sampled congestion data. Accordingly, it is understood that the present invention is not limited to the particular embodiments disclosed, but is intended to cover all modifications that are within the spirit and scope of the invention as defined by the appended claims.

What is claimed:

1. A method of a wireless terminal selecting an access point for connection that can provide a maximum estimated achievable bit rate to said wireless terminal, comprising:

the wireless terminal probing each available access point and receiving congestion information and signal quality information from each access point related to a first modulation mode in response to said probes;

determining the estimated achievable bit rate as a function of said congestion information and said signal quality information for each access point, wherein the signal quality information includes an estimation of the packet error rate of data from one of a set of available modulation modes at each access point based on the signal to noise ratio of a signal received in a first modulation mode from said each access point, and wherein the packet error rate in a second modulation mode at each access point is based on the packet error rate calculated in the first modulation mode; said second modulation mode being different from said first modulation mode; and the wireless terminal selecting an access point from said available access points to connect to that has the highest estimated achievable bit rate among said available access points.

2. The method of claim 1, wherein the wireless terminal receives beacon packets containing congestion information from each access point to be checked for estimated achievable bit rate.

3. The method of claim 1, wherein the packet error rate (PER) is calculated from the bit error rate (BER) in each modulation mode of each access point in accordance with the following relation: PER=1−(1−BER)$^L$, where L is the length of a transmitted data packet.

4. The method of claim 3, wherein the calculating step comprises the steps of determining the maximum achievable bit rate for an access point based on signal quality and modifying the maximum achievable bit rate by a bandwidth correction factor calculated from the congestion information.

5. A wireless terminal that determines the estimated achievable bit rate of one or more available access points and selects an access point for connection that can provide a maximum estimated achievable bit rate to said wireless terminal, comprising:

a receiver that receives, in response to probes from the wireless terminal, congestion information and signal quality information from each available access point related to a first modulation mode; and a processor programmed to determine the estimated achievable bit rate for one of a set of available modulation modes at each access point as a function of said congestion information and said signal quality information for each access point and to select an access point from said available access points to connect to the access point that has the highest estimated achievable bit rate among said access points, wherein the signal quality information includes an estimation of the packet error rate of data from said first modulation mode at each access point based on the signal to noise ratio of a signal received from said each access point in said first modulation mode, and wherein the packet error rate in a second modulation mode at each access point is based on the packet error rate calculated in the first modulation mode; said second modulation mode being different from said first modulation mode.

6. A wireless terminal as in claim 5, further comprising a wireless network card having a firmware algorithm loaded therein that provides the estimated achievable bit rate to said processor.

7. The wireless terminal of claim 5, wherein said congestion information is used by said processor to select a bandwidth correction factor from a look up table.

8. The wireless terminal of claim 5, wherein the receiver receives beacon packets containing congestion information from each access point and said congestion information is used by said processor to select a bandwidth correction factor from a look up table.

9. The wireless terminal of claim 5, wherein said signal quality information is used by said processor to select an estimated packet error rate and/or an estimate of bit error rate of said each access point from a table.

10. The wireless terminal of claim 5, wherein the processor modifies the maximum achievable bit rate for each access point by a bandwidth correction factor calculated from the congestion information.

11. The wireless terminal of claim 5, further comprising a memory that stores a precomputed bandwidth correction factor that is selected by said processor based on said received congestion information.

12. A computer readable storage medium comprising instructions stored thereon that when processed by a processor cause said processor to select an access point for connection that can provide a maximum estimated achievable bit rate to a wireless terminal, said instructions comprising:

a first set of instructions that causes said wireless terminal to probe each available access point and to receive congestion information and signal quality information from each access point related to a first modulation mode in response to said probes;

a second set of instructions that implements a bit rate estimation algorithm for determining a maximum estimated bit rate from one of a set of available modulation modes as a function of said congestion information and said signal quality information for each access point, wherein said signal quality is related to the packet error rate from a first modulation mode at each access point, and wherein the packet error rate in a second modulation mode from each access point is based on the packet error rate calculated in the first modulation mode, said second modulation mode being different from said first modulation mode;

a third set of instructions that implements a correction algorithm that modifies the maximum estimated bit rate calculated by said second set of instructions to said estimated achievable bit rate using a bandwidth correction factor that corrects for congestion on said wireless access point; and a fourth set of instructions that selects an access point from said available access points to connect to that has the highest estimated achievable bit rate among said available access points.

13. The computer readable storage medium of claim 12, further comprising a look up table that stores a precomputed bandwidth correction correlated to congestion levels and accessed using said received congestion information.

14. A method of a wireless terminal selecting an access point for connection that can provide a maximum estimated achievable bit rate to said wireless terminal, comprising:
for each of a plurality of available access points:
the wireless terminal probing an available access point;
in response to the probing, receiving congestion information and signal quality information from the available access point related to a first modulation mode;
based on the signal quality information, looking up in a first look up table an estimated maximum bit rate for the available access point in the first modulation mode;
based on the congestion information and the maximum bit rate of the available access point, looking up in a second look up table an estimated achievable bit rate for the available access point for the first modulation mode; and
for at least one of the plurality of available access points:
based on the congestion information and the signal quality information from the available access point related to a first modulation mode, looking up in a third look up table an estimated achievable bit rate for the available access point for a second modulation mode, the second modulation mode being different from the first modulation mode,
based on the estimated achievable bit error rates (BER) for the first and second modulation modes, determining an estimated achievable packet error rate (PER) for each of the first and second modulation modes in accordance with the following relation: $PER=1-(1-BER)^L$, where L is the length of a transmitted data packet, which relation assumes that the bit errors are uncorrelated, and
based on the estimated achievable bit rates for the plurality of available access points, the wireless terminal selecting an access point from the plurality of available access points to connect to that has the highest estimated achievable bit rate among said available access points.

15. A wireless terminal that determines the estimated achievable bit rate of one or more available access points and selects an access point for connection that can provide a maximum estimated achievable bit rate to said wireless terminal, comprising:
a receiver that receives, in response to probes from the wireless terminal, congestion information and signal quality information from each available access point related to a first modulation mode; and
a processor programmed to implement the following steps for each of a plurality of available access points:
based on the signal quality information, looking up in a first look up table an estimated maximum bit rate for the available access point in the first modulation mode;
based on the congestion information and the maximum bit rate of the available access point, looking up in a second look up table an estimated achievable bit error rate for the available access point for the first modulation mode; and
for at least one of the plurality of available access points the processor implementing the steps of:
based on the congestion information and the signal quality information from the available access point related to the first modulation mode, looking up in a third look up table an estimated achievable bit error rate for the available access point for a second modulation mode, the second modulation mode being different from the first modulation mode,
based on the estimated achievable bit error rates (BER) for the first and second modes, determining an estimated achievable packet error rate (PER) for each of the first and second modulation modes in accordance with the following relation: $PER=1-(1-BER)^L$, where L is the length of a transmitted data packet, which relation assumes that the bit errors are uncorrelated, and
based on the estimated achievable bit error rates for the plurality of available access points, the wireless terminal selecting an access point from the plurality of available access points to connect to that has the highest estimated achievable bit rate among said available access points.

16. A computer readable storage medium comprising instructions stored thereon that when processed by a processor cause said processor to select an access point for connection that can provide a maximum estimated achievable bit rate to a wireless terminal, said instructions comprising:
a first set of instructions that causes said wireless terminal to probe each available access point and to receive congestion information and signal quality information from each available access point related to a first modulation mode in response to said probes;
a second set of instructions that looks up, based on the signal quality information, in a first look up table an estimated maximum bit rate for the available access point in the first modulation mode;
a third set of instructions that looks up, based on the congestion information and the maximum bit rate of the available access point, in a second look up table an estimated achievable bit rate for the available access point for the first modulation mode; and
a fourth set of instructions that determines for at least one of the plurality of available access points:
based on the congestion information and the signal quality information from the available access point related to the first modulation mode, looking up in a third look up table an estimated achievable bit rate for the available access point for a second modulation mode, the second modulation mode being different from the first modulation mode,
based on the estimated achievable bit error rates (BER) for the first and second modulation modes, determining an estimated achievable packet error rate (PER) for each of the first and second modulation modes in accordance with the following relation: $PER=1-(1-BER)^L$, where L is the length of a transmitted data packet, which relation assumes that the bit errors are uncorrelated, and
based on the estimated achievable bit rates for the plurality of available access points, the wireless terminal selecting an access point from the plurality of available access points to connect to that has the highest estimated achievable bit rate among said available access points.

* * * * *